US010510040B2

(12) United States Patent
Kurokawa

(10) Patent No.: US 10,510,040 B2
(45) Date of Patent: Dec. 17, 2019

(54) INTERMEDIARY DEVICE, SYSTEM, AND METHOD FOR DELIVERY OF REPLACEMENT COMPONENTS OF A DEVICE

(71) Applicant: BROTHER KOGYO KABUSHIKI KAISHA, Nagoya-shi, Aichi-ken (JP)

(72) Inventor: Yohei Kurokawa, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 271 days.

(21) Appl. No.: 15/362,151

(22) Filed: Nov. 28, 2016

(65) Prior Publication Data
US 2017/0154300 A1 Jun. 1, 2017

(30) Foreign Application Priority Data
Nov. 30, 2015 (JP) .................. 2015-233920

(51) Int. Cl.
G06Q 10/08 (2012.01)
G06Q 20/08 (2012.01)

(52) U.S. Cl.
CPC ......... G06Q 10/087 (2013.01); G06Q 20/085 (2013.01)

(58) Field of Classification Search
CPC ............ G06Q 10/087; G06Q 20/085; G06Q 30/0633; G06Q 30/0613
(Continued)

(56) References Cited

U.S. PATENT DOCUMENTS 4,479,196 A * 10/1984 Ferrer ................ G06F 16/288
4,646,229 A * 2/1987 Boyle ..................... H04Q 3/47
(Continued)

FOREIGN PATENT DOCUMENTS

JP 2003-157378 A 5/2003
JP 2004-178175 A 6/2004
(Continued)

OTHER PUBLICATIONS

Extended European Search Report from corresponding European Paten Application No. 16199857.0, dated Feb. 3, 2017.
(Continued)

Primary Examiner — Andrew Joseph Rudy
(74) Attorney, Agent, or Firm — Merchant & Gould P.C.

(57) ABSTRACT

An administrative server stores replacement component information relating to at least one replacement component that can be distributed by a supplier in delivery service. A replacement component desired by the user is selected. A selected replacement component information relating to the at least one selected replacement component is transmitted to the administrative server. When the usage degree of at least one of the at least one selected replacement component indicated by the usage degree information reaches a predetermined usage degree, the ordering request specifying the at least one replacement component included in the selected replacement component information is transmitted to the supplier. Therefore, the supplier can offer the automatic sales service with a replacement component that the supplier distributes normally without preparing a wide variety of replacement components, which reduces burden on the supplier.

29 Claims, 13 Drawing Sheets

(58) Field of Classification Search
USPC ............ 235/376–385, 462.01; 700/107, 117, 700/175, 182, 236; 705/28, 30; 715/764, 715/765, 821; 718/1, 101, 102, 104, 106, 718/107
See application file for complete search history.

(56) References Cited

U.S. PATENT DOCUMENTS

| | | | | |
|---|---|---|---|---|
| 4,805,134 | A * | 2/1989 | Calo | G06F 9/468 |
| 6,113,208 | A * | 9/2000 | Benjamin | B41J 2/17546 |
| | | | | 347/7 |
| 6,572,318 | B2 * | 6/2003 | Cobene | B42C 19/02 |
| | | | | 399/24 |
| 7,124,097 | B2 * | 10/2006 | Claremont | G06Q 30/06 |
| | | | | 705/26.81 |
| 7,124,373 | B1 * | 10/2006 | Patil | G06F 3/0486 |
| | | | | 715/779 |
| 7,266,518 | B2 * | 9/2007 | Klim | G06Q 10/06 |
| | | | | 705/28 |
| 7,386,363 | B2 * | 6/2008 | Murray | G06Q 10/087 |
| | | | | 700/175 |
| 7,434,730 | B2 * | 10/2008 | Jain | G06Q 10/087 |
| | | | | 235/376 |
| 7,526,215 | B2 * | 4/2009 | Moodie | G03G 15/55 |
| | | | | 399/24 |
| 7,822,645 | B2 * | 10/2010 | Claremont | G06Q 30/06 |
| | | | | 705/26.1 |
| 8,024,236 | B2 * | 9/2011 | Vitulli | G06Q 10/087 |
| | | | | 705/28 |
| 8,224,481 | B2 * | 7/2012 | Bylsma | A61M 5/1413 |
| | | | | 222/129.4 |
| 8,924,262 | B2 * | 12/2014 | Shuster | G06Q 10/087 |
| 9,120,115 | B2 * | 9/2015 | Beal | H04L 65/1006 |
| 9,292,802 | B2 * | 3/2016 | Arakawa | G06Q 10/00 |
| 9,488,947 | B2 * | 11/2016 | Shenoy | G06Q 30/06 |
| | | | | 705/26.1 |
| 9,659,272 | B2 * | 5/2017 | Birch | G06Q 10/087 |
| 9,923,989 | B2 * | 3/2018 | Zourzouvillys | H04L 65/1006 |
| 2007/0005392 | A1 | 1/2007 | Claremont et al. | |
| 2008/0071626 | A1 | 3/2008 | Hill | |
| 2008/0126228 | A1 | 5/2008 | Nagai et al. | |

FOREIGN PATENT DOCUMENTS

| | | |
|---|---|---|
| JP | 2005-157866 A | 6/2005 |
| JP | 2008-159002 A | 7/2008 |

OTHER PUBLICATIONS

Notice of Reasons for Refusal mailed in related Japanese application No. 2015-233920, dated Sep. 3, 2019.

* cited by examiner

Fig. 7

| PARTNER INFORMATION | | | |
|---|---|---|---|
| PARTNER ID | ABC | DEF | ... |
| URL FOR AUTHORITY DELEGATION | https://auth.ABC.co.jp | https://auth.DEF.com | ... |
| URL FOR ORDERING | https://order.ABC.co.jp | https://order.DEF.com | ... |
| QUERY STRING | abc... | def... | ... |

Fig.8

| PARTNER DISTRIBUTION FLAG | PRODUCT NAME | DESCRIPTION | PRODUCT CODE |
|---|---|---|---|
| OFF | TN241BK | TONER CARTRIDGE (BLACK) | XLKYLD |
| OFF | TN241C | TONER CARTRIDGE (CYAN) | STLIKB |
| OFF | TN241M | TONER CARTRIDGE (MAGENTA) | BXLCDA |
| OFF | TN241Y | TONER CARTRIDGE (YELLOW) | AKMOCD |
| OFF | TN245BK | LARGE-CAPACITY TONER CARTRIDGE (BLACK) | ABCDEFG |
| OFF | TN245C | LARGE-CAPACITY TONER CARTRIDGE (CYAN) | HIJKLMN |
| OFF | TN245M | LARGE-CAPACITY TONER CARTRIDGE (MAGENTA) | OPQRST |
| OFF | TN245Y | LARGE-CAPACITY TONER CARTRIDGE (YELLOW) | UVWXYZ |
| ... | ... | ... | ... |

Fig. 9

| PARTNER DISTRIBUTION FLAG | PRODUCT NAME | DESCRIPTION | PRODUCT CODE |
|---|---|---|---|
| ON | TN241BK | TONER CARTRIDGE (BLACK) | AAAAAA |
| ON | TN241C | TONER CARTRIDGE (CYAN) | BBBBBB |
| ON | TN241M | TONER CARTRIDGE (MAGENTA) | CCCCCC |
| ON | TN241Y | TONER CARTRIDGE (YELLOW) | DDDDDD |
| ON | TN245BK | LARGE-CAPACITY TONER CARTRIDGE (BLACK) | EEEEEE |
| OFF | TN245C | LARGE-CAPACITY TONER CARTRIDGE (CYAN) | HIJKLMN |
| OFF | TN245M | LARGE-CAPACITY TONER CARTRIDGE (MAGENTA) | OPQRST |
| OFF | TN245Y | LARGE-CAPACITY TONER CARTRIDGE (YELLOW) | UVWXYZ |
| ... | ... | ... | ... |

Fig. 10

| PRODUCT NAME | DESCRIPTION | PRODUCT CODE |
|---|---|---|
| TN241BK | TONER CARTRIDGE (BLACK) | AAAAAA |
| TN241C | TONER CARTRIDGE (CYAN) | BBBBBB |
| TN241M | TONER CARTRIDGE (MAGENTA) | CCCCCC |
| TN241Y | TONER CARTRIDGE (YELLOW) | DDDDDD |
| TN245BK | LARGE-CAPACITY TONER CARTRIDGE (BLACK) | EEEEEE |
| ... | ... | ... |

Fig.11

DISPATCH INFORMATION

| ID | ADDRESS | CHARGE COLLECTING METHOD | ACCESS TOKEN |
|---|---|---|---|
| User A | Xxxxx··· | CREDIT CARD | czCaGRSa3··· |
| User B | Oooo··· | CASH ON DELIVERY | Vaev32asf3a··· |
| User C | 1234··· | BANK TRANSFER | F54fwDdwfc··· |

Fig.12

| PRODUCT NAME | DESCRIPTION | APPLICABLE MODEL | PARTNER A DISTRIBUTION FLAG | PARTNER B DISTRIBUTION FLAG | PARTNER C DISTRIBUTION FLAG | ... |
|---|---|---|---|---|---|---|
| TN241BK | TONER CARTRIDGE (BLACK) | A,B,C | ON | ON | ON | ... |
| TN241C | TONER CARTRIDGE (CYAN) | C | ON | ON | ON | ... |
| TN241M | TONER CARTRIDGE (MAGENTA) | C | ON | ON | ON | ... |
| TN241Y | TONER CARTRIDGE (YELLOW) | C | ON | ON | ON | ... |
| TN245BK | LARGE-CAPACITY TONER CARTRIDGE (BLACK) | A,B,C | ON | OFF | ON | ... |
| TN255BK | EXTRA LARGE-CAPACITY TONER CARTRIDGE (BLACK) | B,C | OFF | OFF | ON | ... |
| DR-291CL-BK | DRUM | A,B,C | ON | ON | OFF | ... |
| BU-220CL | BELT | A,C | ON | ON | OFF | ... |
| ... | ... | ... | ... | ... | ... | ... |

Fig.13

| REPLACEMENT COMPONENT CATEGORY | PRODUCT NAME | DESCRIPTION | REPLACEMENT COMPONENT |
|---|---|---|---|
| TONER CARTRIDGE (BLACK) | TN241BK | ... | |
| | TN245BK | ... | ✓ |
| DRUM | DR-291CL-BK | ... | ✓ |
| BELT | BU-220CL | ... | | ate
INTERMEDIARY DEVICE, SYSTEM, AND METHOD FOR DELIVERY OF REPLACEMENT COMPONENTS OF A DEVICE

CROSS-REFERENCE TO RELATED APPLICATION

This application claims priority from Japanese Patent Application No. 2015-233920, filed on Nov. 30, 2015, which is incorporated herein by reference in its entirety.

BACKGROUND OF THE INVENTION

1. Field of the Invention

The present disclosure relates to an intermediary device configured to offer a delivery service for replacement components of a device.

2. Description of Related Art

Recently, as disclosed in the following patent document, a technique has been developed in which an information processing device having a driver of a printer installed therein monitors a remaining amount of a colorant, e.g., ink, used in the printer and, when the remaining amount of the colorant becomes relatively low, automatically places an order for the colorant.

PATENT DOCUMENT

Japanese Laid-Open Patent Application No. 2004-178175

SUMMARY OF THE INVENTION

In the technique disclosed in the above-listed patent document, a replacement component to be ordered is selected from a replacement component list that an application installed in the information processing device maintains. Therefore, a supplier who accepts orders for replacement components needs to prepare all replacement components included in the replacement component list that the application maintains, which may become burdensome to the supplier.

In an example aspect, a system of the present disclosure comprises a server. The server comprises: a communication interface; a memory; and a controller. The controller operatively connected to the communication interface and the memory. The controller configured to execute instructions from the memory that, when executed, cause the server to perform: in response to receipt of a request from a user device, transmitting replacement component information to the user device via the communication interface, wherein the replacement component information relates to one or more replacement components that can be distributed through a delivery service implemented by an external device and which is useable in a device that is associated with a user of the user device and which has replaceable components, the one or more replacement components being among the replaceable components useable in the device; receiving selected replacement component information that relates to a selected replacement component from the one or more replacement components included in the replacement component information, via the communication interface, from the user device; storing the selected replacement component information in the memory in association with device identification information, wherein the device identification information identifies the device associated with the user and which has replaceable components; receiving, via the communication interface, usage degree information and the device identification information of the device, wherein the usage degree information indicates a degree to which the selected replacement component of the device has been used; and based on the usage degree information indicating that the selected replacement component has reached a predetermined usage degree, transmitting an ordering request to the external device via the communication interface, wherein the ordering request includes first user identification information and specifies the selected replacement component, wherein the first user identification information is used in the external device for identifying the user of the device identified by the device identification information.

In a further example aspect, a method for reordering replacement components of the present disclosure comprises: in response to receipt of a request from a user device at a server having a memory and a communication interface, transmitting replacement component information to the user device via the communication interface, wherein the replacement component information relates to one or more replacement components that can be distributed through a delivery service implemented by an external device and which is useable in a device that is associated with a user of the user device and which has replaceable components, the one or more replacement components being among the replaceable components useable in the device; receiving selected replacement component information that relates to a selected replacement component from the one or more replacement components included in the replacement component information, via the communication interface, from the user device; storing the selected replacement component information in the memory in association with device identification information, wherein the device identification information identifies the device associated with the user and which has replaceable components; receiving, via the communication interface, usage degree information and the device identification information of the device, wherein the usage degree information indicates a degree to which at least the selected replacement component of the device has been used; and based on the usage degree information indicating that the selected replacement component has reached a predetermined usage degree, transmitting an ordering request from the server to the external device via the communication interface, wherein the ordering request includes first user identification information and specifies the selected replacement component, wherein the first user identification information is used in the external device for identifying the user of the device identified by the device identification information.

In a further example aspect, a method for reordering replacement components of the present disclosure comprises: transmitting a request to a server; receiving, in response to the request, replacement component information relating to one or more replacement components that can be distributed through a delivery service implemented by an external device, the delivery service being useable by a device that is associated with a user and which has replaceable components, the one or more replacement components being among the replaceable components useable in the device; and transmitting, to the server, selected replacement component information that relates to a selected replacement component from the one or more replacement components included in the replacement component information; wherein, based on usage degree information transmitted to the server that indicates that the selected replacement component has reached a predetermined usage degree, an ordering request is issued to the external device, wherein the ordering request includes first user identification information and specifies the selected replacement component, wherein the first user identification information is used in the external device for identifying the user of the device identified by the device identification information, and wherein the usage degree information indicates a degree to which at least the selected replacement component of the device has been used.

In a further example aspect, a system for reordering replacement components of the present disclosure comprises a server. The server comprises: a communication interface; a memory; and a controller. The controller operatively connected to the communication interface and the memory, the controller configured to execute instructions from the memory that, when executed, cause the server to perform: receiving a request from a user device including connection information associated with an external device implementing a delivery service; storing replacement component information in the memory of the server in association with device identification information and the connection information, the replacement component information relating to one or more replacement components that can be distributed through the delivery service implemented by the external device and which are useable in a device which has replaceable components and is associated with a user of the user device, the device being identified by the device identification information; receiving, via the communication interface, usage degree information and the device identification information of the device, wherein the usage degree information indicates a degree to which the replacement component of the device has been used; and based on the usage degree information indicating that the replacement component has reached a predetermined usage degree, transmitting an ordering request to the external device via the communication interface, wherein the ordering request includes first user identification information and specifies the replacement component, wherein the first user identification information is used in the external device for identifying the user of the device identified by the device identification information.

In a further example aspect, an intermediary device of the present disclosure comprises: a communication portion configured to communicate with a user's information processing device and an external device for implementing a delivery service for replacement components of a device; a storage portion; and a controller. The controller includes: first transmitting means configured to, in response to receipt from the user's information processing device of a request based on connection information received by the user's information processing device from the external device, transmit replacement component information to the user's information processing device via the communication portion, wherein the replacement component information is stored in the storage portion and relates to at least one replacement component that can be distributed through the delivery service implemented by the external device among the replacement components used in the device; first receiving means configured to receive selected replacement component information that relates to at least one replacement component selected from the at least one replacement component included in the replacement component information, via the communication portion, from the user's information processing device to which the replacement component information is transmitted by the first transmitting means; first storage control means configured to store the at least one selected replacement component information and device identification information in the storage portion in association with each other, wherein the device identification information is for identifying the device owned by a user of the user's information processing device that has transmitted the request based on the connection information; second receiving means configured to receive, via the communication portion, usage degree information and the device identification information of the device, wherein the usage degree information indicates degree to which each of the replacement components of the device has been used; and second transmitting means configured to, when, in the usage degree information received by the second receiving means, of the replacement components of the device, the degree to which at least one of the at least one selected replacement component included in the selected replacement component information has been used reaches a predetermined usage degree, transmit an ordering request to the external device, via the communication portion, wherein the ordering request includes first user identification information and specifies the at least one replacement component included in the selected replacement component information stored in the storage portion in association with the device identification information received by the second receiving means, wherein the first user identification information is used in the external device for identifying the user of the device identified by the device identification information received by the second receiving means.

In a further example aspect, an intermediary device of the present disclosure comprises: a communication interface configured to communicate with a user's information processing device and an external device for implementing a delivery service for replacement components of a device; a memory; and a controller. The controller configured to execute instructions from the memory that, when executed, cause the server to perform: transmitting, in response to receipt from the user's information processing device of a request based on connection information received by the user's information processing device from the external device, replacement component information to the user's information processing device via the communication interface, wherein the replacement component information is stored in the memory and relates to at least one replacement component that can be distributed through the delivery service implemented by the external device among the replacement components used in the device; receiving selected replacement component information that relates to at least one replacement component selected from the at least one replacement component included in the replacement component information, via the communication interface, from the user's information processing device to which the replacement component information is transmitted; storing the at least one selected replacement component information and device identification information in the memory in association with each other, wherein the device identification information is for identifying the device owned by a user of the user's information processing device that has transmitted the request based on the connection information; receiving, via the communication interface, usage degree information and the device identification information of the device, wherein the usage degree information indicates degree to which each of the replacement components of the device has been used; and transmitting, when, in the usage degree information, of the replacement components of the device, the degree to which at least one of the at least one selected replacement component included in the selected replacement component information has been used reaches a predetermined usage degree, an ordering request to the external device, via the communication interface, wherein the ordering request includes first user identification information and specifies the at least one replacement component included in the selected replacement component information stored in the memory in association with the device identification information, wherein the first user identification information is used in the external device for identifying the user of the device identified by the device identification information.

BRIEF DESCRIPTION OF THE DRAWINGS

FIG. 7 is a conceptual illustration of partner information.

FIG. 8 is a conceptual illustration of product lineup table information.

FIG. 9 is a conceptual illustration of distribution table information.

FIG. 10 is a conceptual illustration of the distribution table information.

FIG. 11 is a conceptual illustration of dispatch information.

FIG. 12 is a conceptual illustration of the distribution table information.

FIG. 13 is a conceptual illustration of selected product information.

DETAILED DESCRIPTION OF EMBODIMENTS OF THE INVENTION

<Configuration of Communication System>

Figure 1:
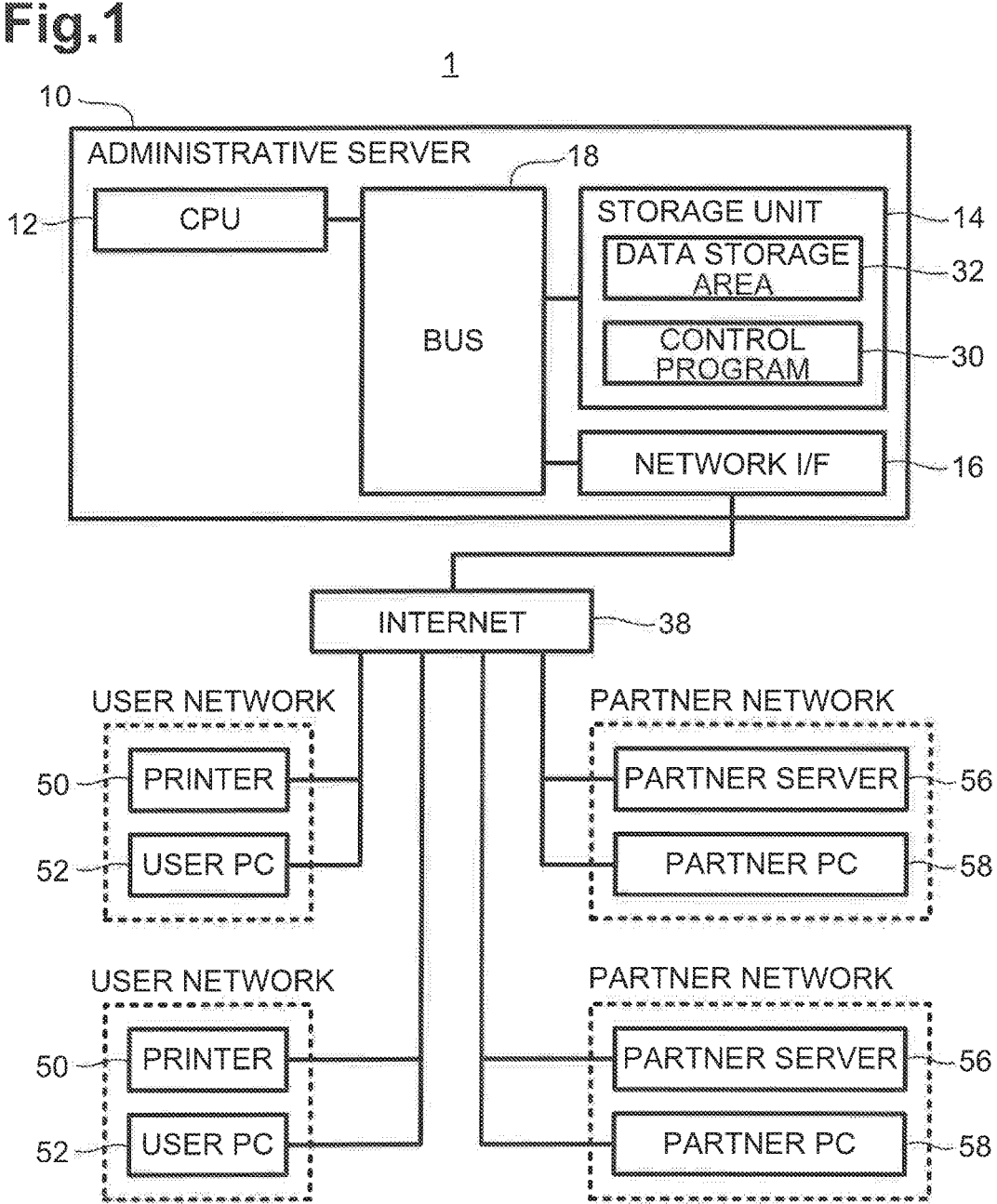
FIG. 1 is a block diagram of a communication system.
Figure 2:
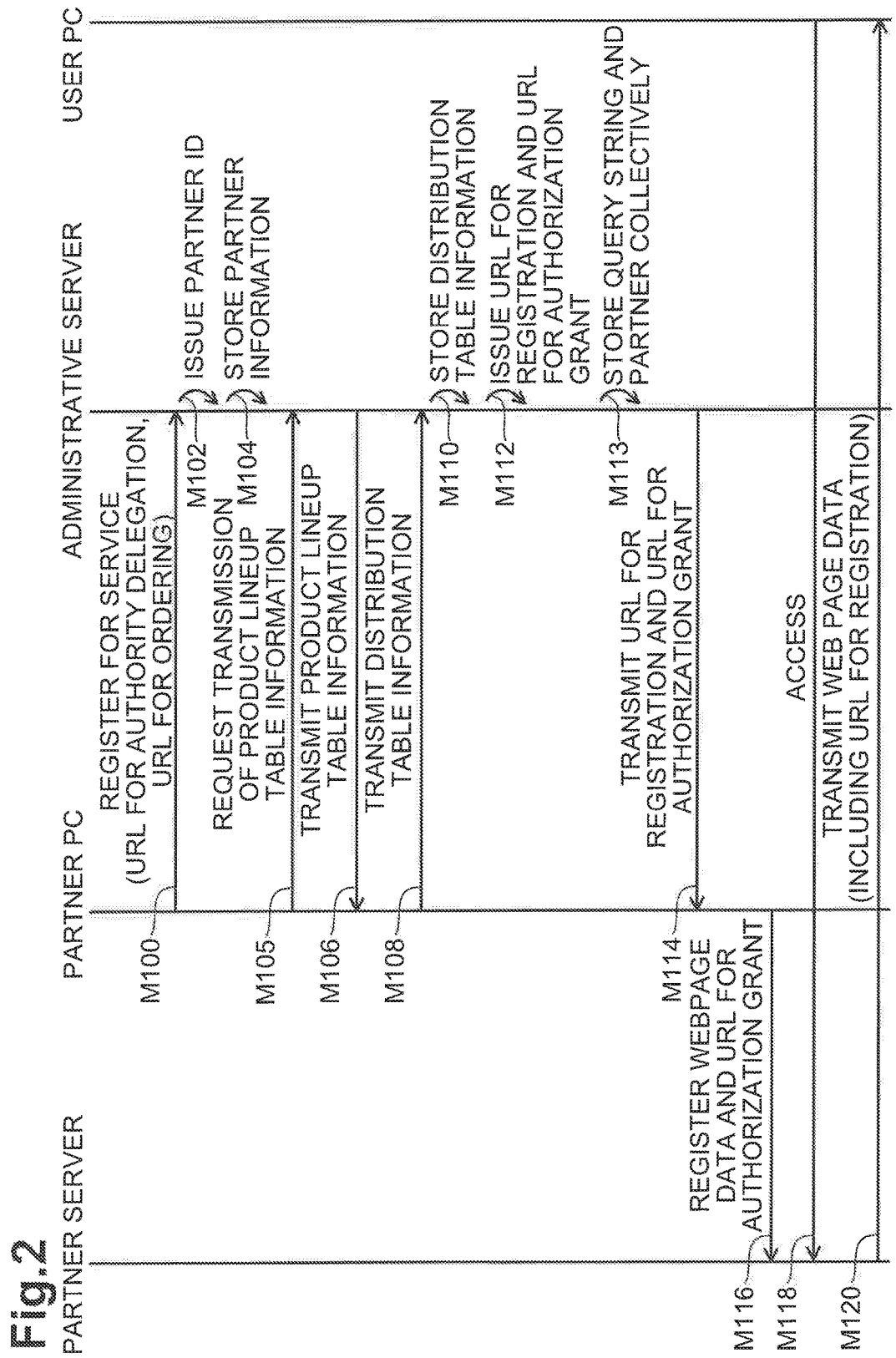
FIG. 2 is a sequence diagram illustrating an operation procedure of the communication system.
Figure 3:
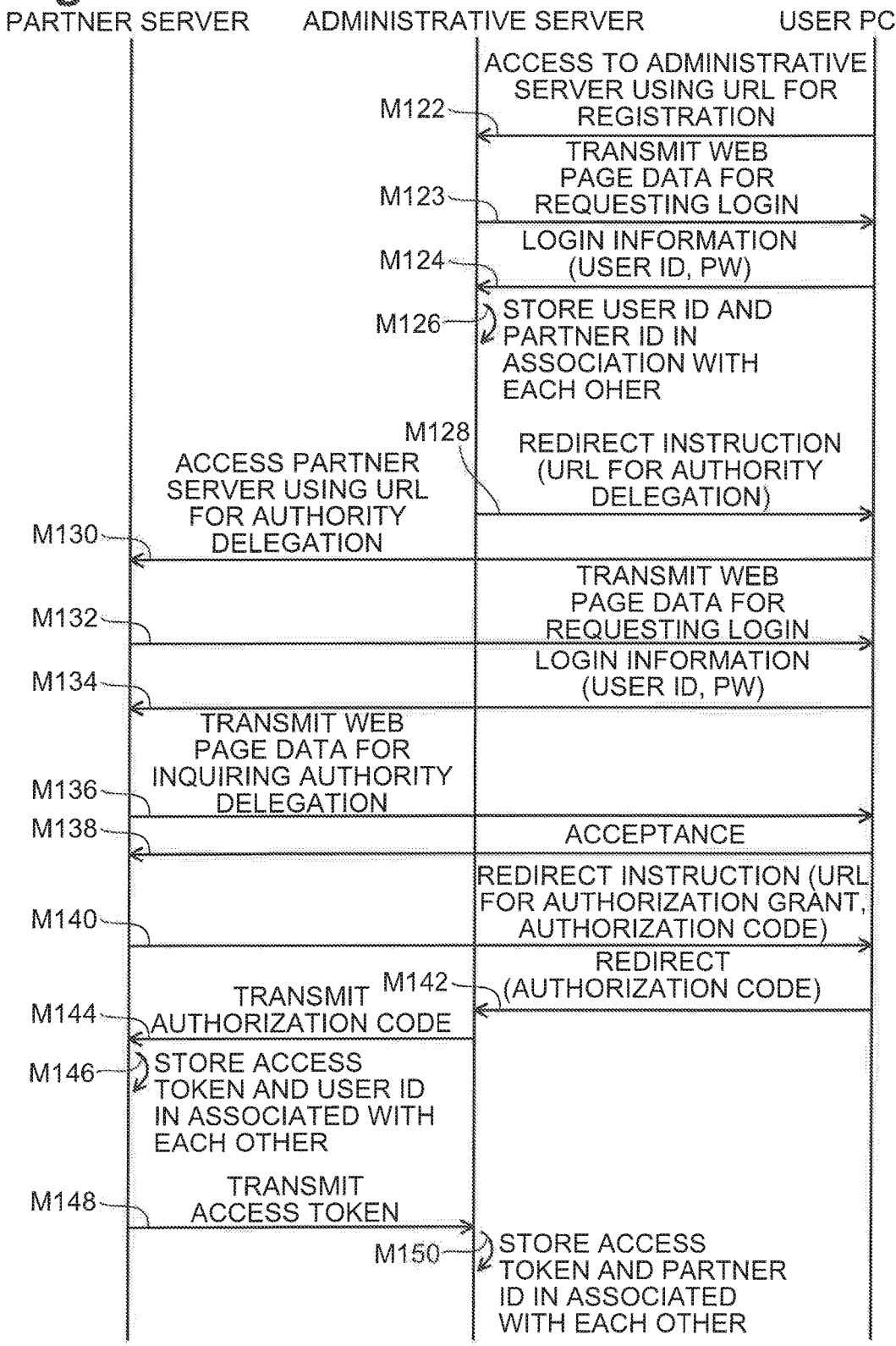
FIG. 3 is a sequence diagram illustrating the operation procedure of the communication system.
Figure 4:
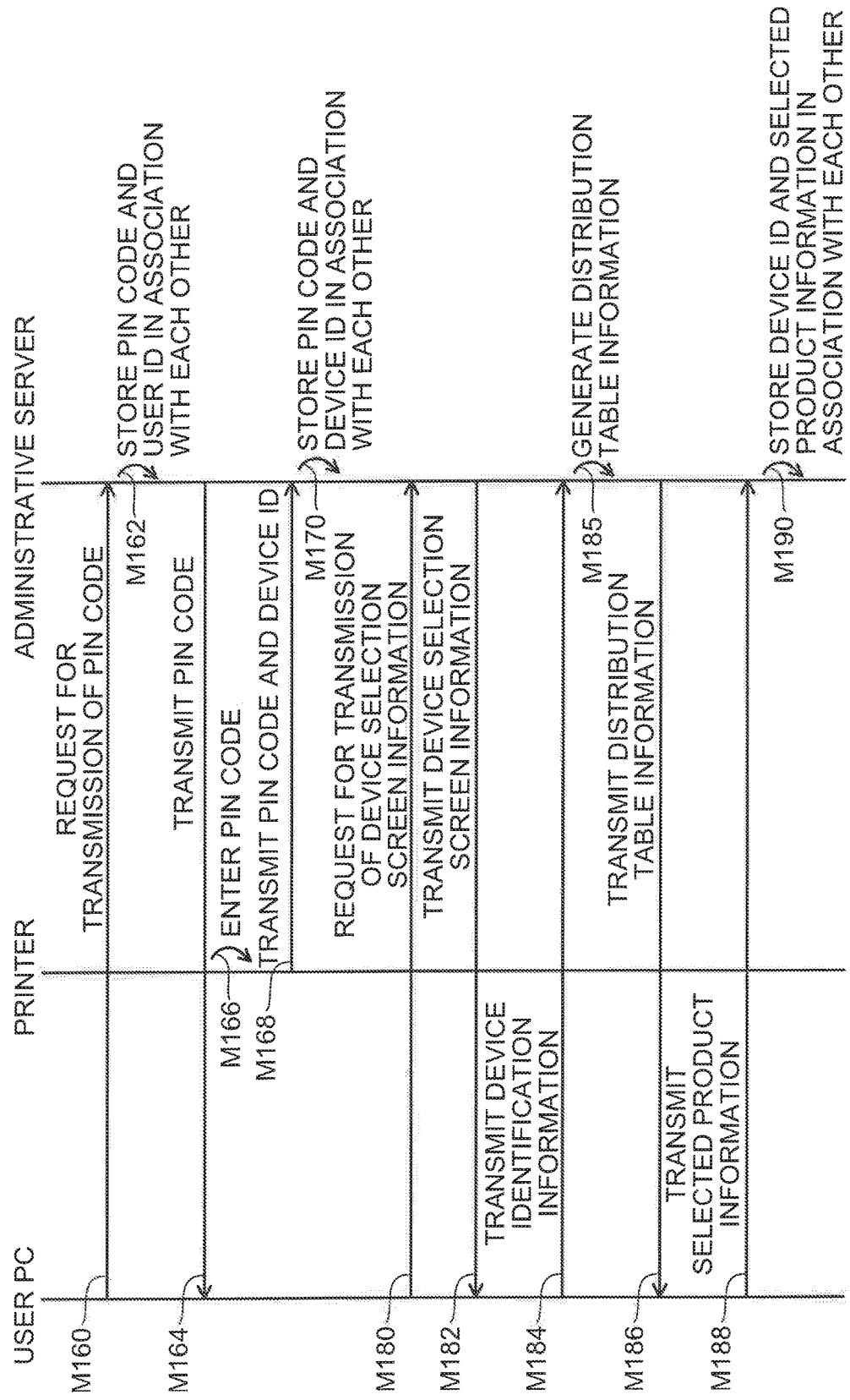
FIG. 4 is a sequence diagram illustrating the operation procedure of the communication system.
Figure 5:
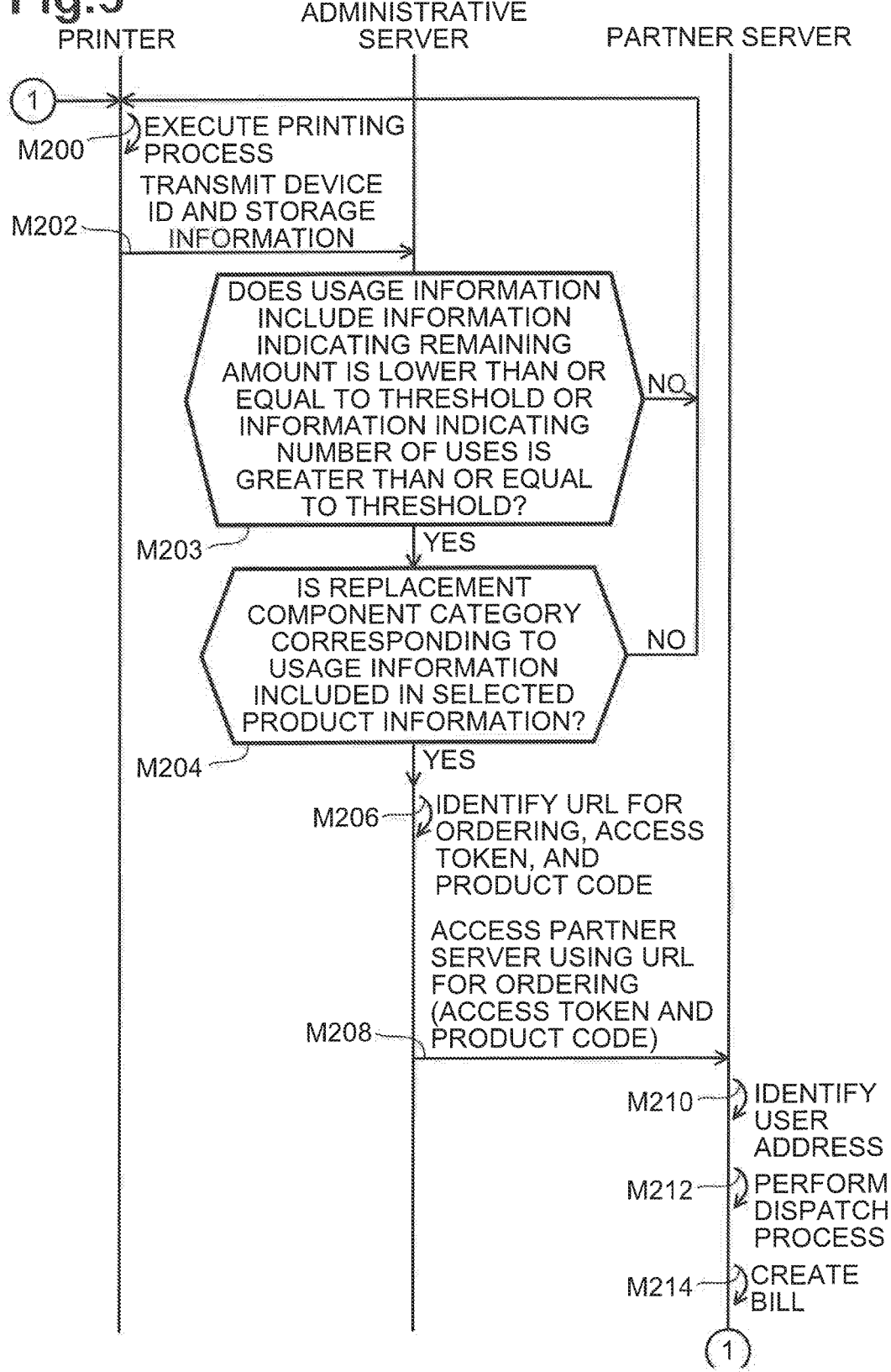
FIG. 5 is a sequence diagram illustrating the operation procedure of the communication system.

FIG. 1 is a block diagram of a communication system 1 illustrated as an embodiment according to the present application. The communication system 1 includes an administrative server (as an example of an intermediary device or a server) 10, a printer (as an example of a device) 50, a user's personal computer ("user PC") (as an example of a user's information processing device or a user device) 52, a partner server (as an example of an external device) 56, a partner PC 58.

The administrative server 10 includes a CPU (CPU stands for central processing unit) (as an example of a controller) 12, a storage portion 14, and a network I/F (as an example of communication portion or a communication interface) 16, which are communicable to each other via a bus 18.

The CPU 12 executes various processing in accordance with a control program 30 stored in the storage portion 14. The control program 30 is for controlling a replacement component delivery service. The storage portion 14 consists of a combination of two or more of a RAM (RAM stands for random access memory), a ROM (ROM stands for read only memory), a flash memory, an HDD (HDD stands for hard disk drive), and a buffer of the CPU 12. The storage portion 14 includes a data storage area (as an example of a storage portion or a memory) 32. The data storage area 32 is for storing data necessary for execution of the control program 30.

The network I/F 16 is configured to communicate with an external device. The network I/F is connected to the Internet 38. The Internet 38 is connected to a user network including the printer 50 and the user PC 52 and is also connected to a partner network including the partner server 56 and the partner PC 58. This configuration enables the administrative server 10 to perform data communication, via the network I/F 16, with the printer 50, the user PC 52, the partner server 56, and the partner PC 58. The Internet 38 is connected to a plurality of user networks and a plurality of partner networks.

<Replaceable Component Delivery Service Through Communication System>

A user of the printer 50 (hereinafter, referred to as a "printer user") is allowed to obtain an automatic ordering service for replacement components of the printer 50. In the embodiment, a company which operates the automatic ordering service manages the administrative server 10, and the printer user registers for the automatic ordering service by accessing the administrative server 10. In response to the user registration for the automatic ordering service, information indicating degree to which each replacement component of the printer 50 has been used (hereinafter, referred to as "usage degree information") (as an example of usage degree information) is transmitted from the printer 50 to the administrative server 10. In response to receipt of the usage degree information, the administrative server 10 determines, based on the usage degree information, whether a replacement component targeted for ordering needs to be replaced with a new one. When it is determined that the replacement component needs to be replaced, the administrative server 10 places an order for the replacement component that needs to be replaced. A supplier who sells replacement components of the printer 50 (hereinafter, simply referred to as the "supplier") and has become one of partners with the company which operates the automatic ordering service accepts an order for the replacement component from the administrative server 10. Then, the supplier dispatches the ordered replacement component to the printer user. As described above, in the automatic ordering service, the replacement component is automatically delivered to the printer user in accordance with its replacing timing. Hereinafter, referring to the sequence diagrams in FIGS. 2, 3, 4, and 5, the automatic ordering service for replacement components will be described in detail. The partner server 56 is managed by the supplier. The partner PC 58 is an information processing device used by the supplier. The user PC 52 is an information processing device used by the printer user. In the sequences, each processing executed in the administrative server 10 is executed by the CPU 12 that operates in accordance with the control program 30.

More specifically, for example, a staff member of the supplier accesses the administrative server 10 using the partner PC 58 for registering as one of partners in the automatic ordering service (M100 (refer to FIG. 2)). At that time, a URL (URL stands for Uniform Resource Locator) for ordering (as an example of destination information) and a URL for authority delegation (as an example of location information) are transmitted from the partner PC 58 to the administrative server 10. The URL for ordering and the URL for authority delegation are URLs for accessing the partner server 56. The administrative server 10 issues a partner ID only for the supplier which is the access source, i.e., a partner ID only for the supplier which is supposed to register for the automatic ordering service as one of the partners (M102). The partner ID represents one possible example of external device identification information, as that term is used in the present disclosure. Then, the administrative server 10 stores the partner ID in the data storage area 32 in association with the URL for ordering and the URL for authority delegation both received in M100, as partner information (refer to FIG. 7) (M104). Thus, the supplier is registered in the administrative server 10, as one of the partners in the automatic ordering service. Normally, a plurality of suppliers have been registered as partners in the automatic ordering service. Therefore, as illustrated in FIG. 7, partner information is stored on a partner basis. In FIG. 7, a single column corresponds to a single partner.

The staff member of the supplier requests transmission of product lineup table information from the administrative server 10 by operating the partner PC 58 (M105). In response to this, the administrative server 10 transmits the product lineup table information to the partner PC 58 (M106). The product lineup table information is stored in the data storage area 32 and relates to all replacement components that can be ordered in the automatic ordering service. That is, the replacement components indicated by the product lineup table information include all replacement components, each of which is available for at least one of printers targeted for the automatic ordering service. The replacement components that can be distributed in the automatic ordering service include, for example, toner cartridges for respective colors for a laser printer, drums, ink cartridges for respective colors for an inkjet printer, and drive force transmission belts for mechanisms for conveying printing sheets inside the printers. That is, the replacement components include consumable components to be replaced due to consumption of ink or toner and components to be replaced due to aging. The toner cartridges include a standard-capacity type and a large-capacity type. The ink cartridges include a standard-capacity type and a large-capacity type. In the product lineup table information, as illustrated in FIG. 8, for each replacement component, a product name of a replacement component, description of the replacement component, and a product code of the replacement component (as an example of replacement component identification information) are associated with each other. For each replacement component, a partner distribution flag is also associated.

In response to transmission of the product lineup table information to the partner PC 58, a screen configured based on the product lineup table information is displayed on a display (not depicted) of the partner PC 58. The staff member of the supplier selects one or more replacement components that the supplier distributes, i.e., one or more replacement components that the supplier can sell, to set one or more partner distribution flags corresponding to the one or more selected replacement components to ON. More specifically, as depicted in FIG. 8, in the product lineup table information transmitted from the administrative server 10, all of the partner distribution flags corresponding to the respective replacement components indicate OFF. As depicted in FIG. 9, the staff member of the supplier sets one or more partner distribution flags corresponding to one or more replacement components that the supplier distributes to ON in the partner PC 58. In the partner PC 58, the staff member of the supplier is also allowed to change a product code included in the product lineup table information as well as the partner distribution flags. Therefore, for example, in a case that a product code included in the product lineup table information transmitted from the administrative server 10 is different from the product code specified for the replacement component that the supplier distributes, the staff member of the supplier changes the product code included in the product lineup table information to the product code specified for the replacement component that the supplier distributes. By doing so, the supplier becomes enabled to accept an order for the replacement component with the supplier's product code.

In response to completion of the partner distribution flag setting, the product lineup table information in which the partner distribution flag setting has been performed is transmitted from the partner PC 58 to the administrative server 10 through an operation of the staff member of the supplier (M108). In the product lineup table information, as depicted in FIG. 9, the partner distribution flags associated with product names of "TN241BK", "TN241C", "TN241M", "TN241Y", and "TN245BK", respectively, indicate ON and the partner distribution flags associated with product names of "TN245C", "TN245M", and "TN245Y", respectively, indicate OFF. That is, the replacement components with the respective product names of "TN241BK", "TN241C", "TN241M", "TN241Y", "TN245BK" can be distributed by the supplier and the replacement components with the respective product names of "TN245C", "TN245M", and "TN245Y" cannot be distributed by the supplier. Therefore, it is conceivable that the product lineup table information in which the partner distribution flag setting has been performed, i.e., the product lineup table information illustrated in FIG. 9, may be synonymous with information regarding "TN241BK", "TN241C", "TN241M", "TN241Y", and "TN245BK" that the supplier can distribute as illustrated in FIG. 10. Accordingly, the product lineup table information in which the partner distribution flag setting has been performed, i.e., the product lineup table information illustrated in FIG. 9, is referred to as distribution table information (as an example of replacement component information). Therefore, in M108, the distribution table information is transmitted from the partner PC 58 to the administrative server 10. Then, the administrative server 10 stores the distribution table information in the data storage area 32 (M110).

Naturally, different partners, i.e., different suppliers, all of which are registered for the automatic ordering service, distribute different replacement components. Therefore, the product lineup table information is transmitted to each of the suppliers from the administrative server 10, and the partner distribution flag setting is performed by each of the suppliers. In the administrative server 10, the distribution table information is stored for each of the suppliers registered for the automatic ordering service.

The administrative server 10 issues a URL for registration (as an example of connection information) and a URL for authorization grant (M112). The URL for registration includes a query string for identifying the registered partner. As illustrated in FIG. 7, the query string and the partner ID are stored collectively in the data storage area 32 (M113). In response to the issuance of the URL for registration and the URL for authorization grant, the URL for registration and the URL for authorization grant are transmitted from the administrative server 10 to the partner PC 58 (M114). Then, the staff member of the supplier registers, in the partner server 56, Web page data including the URL for registration as a link by operating the partner PC 58, and stores the URL for authorization grant in the partner server 56 by operating the partner PC 58 (M116).

The printer user accesses a website of the supplier, i.e., the partner server 56, using the user PC 52, for purchasing one or more replacement components (M118). The partner server 56 is used for accepting orders for replacement components on the website and dispatching the one or more ordered replacement components, and the supplier offers, on their own, a service for accepting orders for replacement components on the website and dispatching the ordered replacement components, that is, the supplier offers a conventional sales service using the website. Therefore, the printer user has been registered for the conventional sales service offered by the supplier. As illustrated in FIG. 11, the partner server 56 stores, as dispatch information, a user ID of the printer user, an address of the printer user, and a charge collecting method for collecting a charge of a distributed product in association with each other. Thus, through the conventional sales service, the partner server 56 accepts an order for one or more replacement components from the printer user and dispatches the one or more ordered replacement components to an address which is stored as user information.

Nevertheless, the supplier has registered as one of the partners for the automatic ordering service. Therefore, the supplier offers not only the conventional sales service but also offers the automatic ordering service. Thus, in response to access to the partner server 56 from the user PC 52, the partner server 56 transmits, to the user PC 52, Web page data assigned with a link to the URL for registration registered in M116, for soliciting the printer user to register for the automatic ordering service (M120). The printer user is guided to the administrative server 10 by operating the link in the user PC 52. That is, in response to the user's operation to the link, the user PC 52 accesses the administrative server 10 using the URL for registration (M122 (refer to FIG. 3)).

Figure 6:
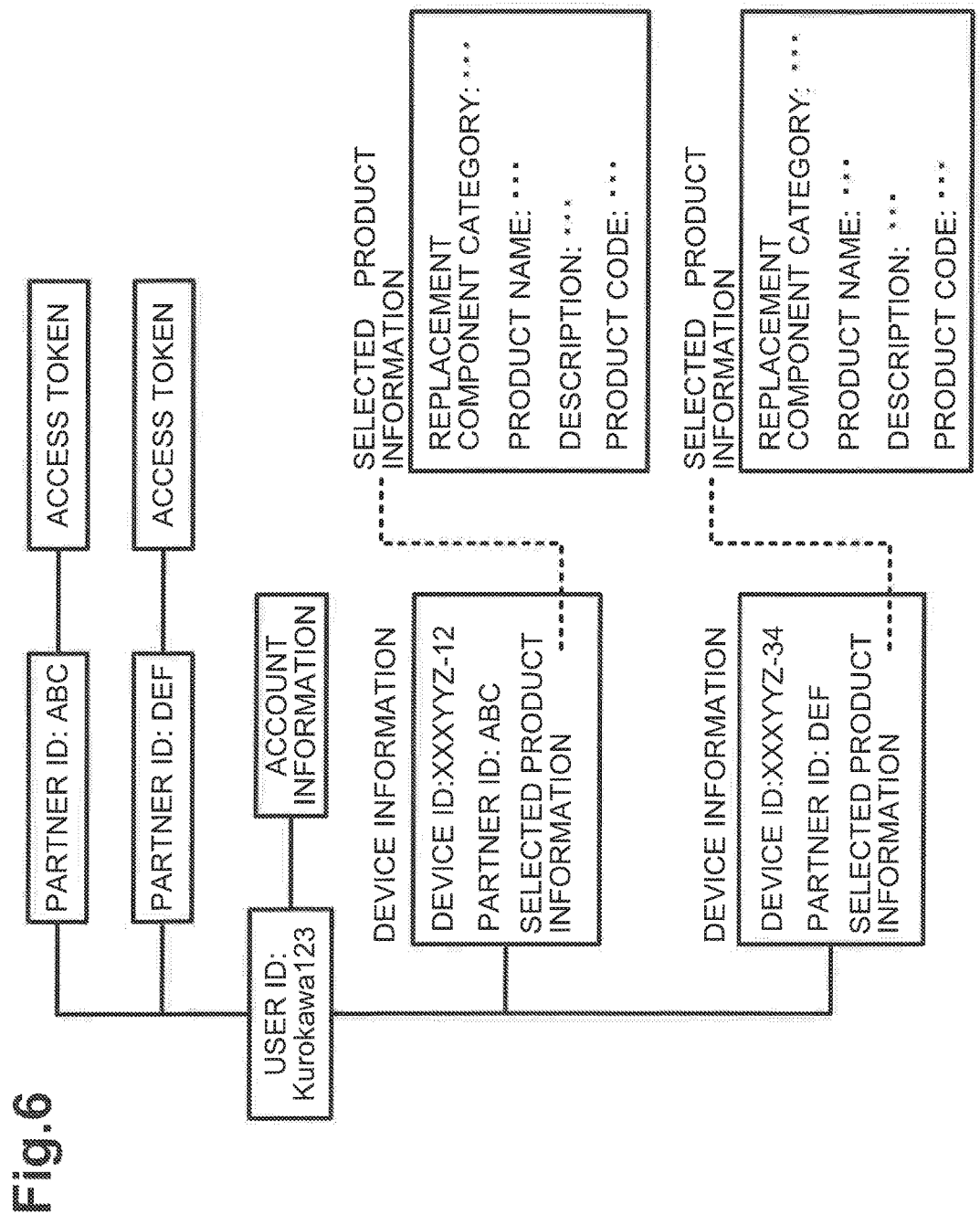
FIG. 6 is a conceptual illustration of various information stored in a data storage area.

In response to the request received in M122, the administrative server 10 transmits, to the user PC 52, Web page data for requesting a login (M123). In response to this, the printer user transmits login information for registering for the automatic ordering service as one of users by operating the user PC 52 (M124). The login information includes a user ID (as an example of second user identification information) and password for administrative server. As illustrated in FIG. 6, the administrative server 10 stores the user ID and account information in the data storage area 32 in association with each other. The account information includes various personal information, e.g., a password and a mail address. In data illustrated in FIG. 6, for example, a user ID is associated with a partner ID and device information. However, the user ID is associated with the account information only at this stage. The data illustrated in FIG. 6 is stored in the data storage area 32 through the following processing. Then, the administrative server 10 stores the partner ID, which is identified based on the URL for registration used at the time of accessing the administrative server 10, and the user ID received in M124 in a temporary storage area of the data storage area 32, in association with each other (M126). More specifically, as described above, the URL for registration includes the query string for identifying the registered partner. Therefore, the partner information (refer to FIG. 7) is referred to identify the partner ID corresponding to the query string. The partner ID and the user ID transmitted from the user PC 52 are stored in the temporary storage area in association with each other.

The administrative server 10 identifies the URL for authority delegation included in the partner information stored in association with the partner ID identified from the URL for registration (refer to FIG. 7). The administrative server 10 transmits, to the user PC 52, a redirect instruction including the URL for authority delegation (M128). In response to receipt of the URL for authority delegation, the user PC 52 accesses, through an operation of the printer user, the partner server 56 using the URL for authority delegation (M130). In response to accept of the access from the user PC 52, the partner server 56 transmits, to the user PC 52, Web page data for requesting a login (M132). The user PC 52 transmits, to the partner server 56, login information through an operation of the printer user (M134). The login information includes a user ID and password for partner server.

The partner server 56 transmits, to the user PC 52, Web page data for inquiring authority delegation (M136). The authority delegation enables the administrative server 10 to, in the automatic ordering service, monitor usage conditions of replacement components of the printer 50 and place an order for a targeted replacement component in accordance with degree to which the targeted replacement component has been used. That is, in the automatic ordering service, on behalf of the printer user, the administrative server 10 places an order for the targeted replacement component. Therefore, an inquiry about whether an authority to place an order for the targeted replacement component is delegated to the administrative server 10, is transmitted to the user PC 52. In response to transmission of an acceptance response to the inquiry to the partner server 56 from the user PC 52 through an operation of the printer user (M138), the partner server 56 transmits, to the user PC 52, a redirect instruction including an URL for authorization grant and an authorization code (M140). The user PC 52 redirects the administrative server 10 in accordance with the redirect instruction through an operation of the printer user (M142). That is, the user PC 52 accesses the administrative server 10 using the URL for authorization grant and transmits an authorization code to the administrative server 10.

The administrative server 10 that has received the authorization code transmits the received authorization code to the partner server 56 (M144). The partner server 56 determines whether the authorization code transmitted in M140 matches the authorization code received in M144. When the authorization code transmitted in M140 matches the authorization code received in M144, the partner server 56 issues an access token (as an example of first user identification information) and stores, as dispatch information, the access token and the user ID received in M134 in association with each other (M146). Therefore, as illustrated in FIG. 11, in the partner server 56, the user ID, the address, the charge collecting method, and the access token are stored as dispatch information in association with each other. The partner server 56 transmits the access token to the administrative server 10 (M148). The administrative server 10 stores, in the data storage area 32, the received access token and the partner ID stored in the temporary storage area in M126, in association with each other (M150). Therefore, as illustrated in FIG. 6, the partner ID and the access token are associated with each other.

Processing in M128 to M148 are executed using OAuth2. OAuth2 is a protocol that allows a third party to perform a function of a specified service on behalf of the user. The processing executed in steps other than the processing executed in M128 to M148, i.e., the processing executed in M100 to M126, the processing executed in M150 and subsequent steps, and processing described below, are executed using a common communication protocol, e.g., a Hypertext Transfer Protocol ("HTTP").

The printer user registers one or more printers to be targeted for the automatic delivery service. More specifically, since M124, the user PC 52 has maintained a state of being logged in the administrative server 10. In a subsequent step (not depicted), Web page data for logged-in user is transmitted from the administrative server 10 to the user PC 52, and a screen designed for logged-in user is displayed on the user PC 52. The screen designed for logged-in user (not depicted) includes an icon for instructing an issuance of a PIN code. In response to selection of the icon by the user using, for example, a mouse, the user PC 52 transmits a request for transmission of a PIN code, to the administrative server 10 through an operation of the printer user (M160). In response to receipt of the request, the administrative server 10 issues a PIN code and stores the PIN code and the user ID in the data storage area 32 in association with each other (M162). The administrative server 10 transmits the PIN code to the user PC 52 (M164). In response to receipt of the PIN code in the user PC 52, the printer user enters the PIN code to the printer 50 (M166). In response to the entry of the PIN code, the printer 50 transmits the PIN code and its device ID (as an example of device identification information) to the administrative server 10 (M168). The administrative server 10 identifies the user ID which has been associated with the received PIN code in M162, and stores the user ID and the received device ID in the data storage area 32 in association with each other (M170). The device information is stored on a printer basis. That is, in a case that the printer user has registered a printer A and a printer B for the automatic ordering service, a device ID of the printer A and the user ID of the printer user are stored in association with each other, and a device ID of the printer B and the user ID of the printer user are stored in association with each other. The device ID may be, for example, a unique serial number stored in each printer before their shipment.

The printer user specifies one or more replacement components to be targeted for delivery through the automatic delivery service. More specifically, the screen designed for logged-in user further includes an icon for requesting transmission of device selection screen information. In response to selection of the icon by the user using, for example, a mouse, the user PC 52 transmits a request for transmission of the device selection screen information, to the administrative server 10 through an operation of the printer user (M180). The administrative server 10 transmits the device selection screen information to the user PC 52 (M182). The device selection screen information is Web page data for displaying a screen for enabling the printer user to select, from one or more printers owned by the printer user, one or more printers to be targeted for the automatic delivery service. The Web page data includes, for example, the device ID, model, and image of each of the one or more printers. More specifically, all of one or more device IDs associated with the user ID of the user logging in the administrative server 10 are identified based on the one or more device IDs stored in the data storage area 32. Web page data including the one or more identified device IDs, one or more models of printers, and one or more images is generated by the administrative server 10. The Web page data, i.e., the device selection screen information, is transmitted from the administrative server 10 to the user PC 52.

In the user PC 52 that has received the device selection screen information, a screen configured based on the device selection screen information is displayed on the display. The printer user selects one or more printers to be targeted for the automatic ordering service from the one or more printers displayed on the screen. The device identification information for identifying each of the one or more selected printers is transmitted from the user PC 52 to the administrative server 10 through an operation of the printer user (M184). In response to receipt of the device identification information, the administrative server 10 identifies the one or more printers based on the device identification information and generates distribution table information in accordance with the one or more printers (M185).

More specifically, as described above, the distribution table information is stored for each of the plurality of partners that have registered for the automatic ordering service. The distribution table information illustrated in FIG. 9 is stored corresponding to a single partner. As illustrated in FIG. 12, a plurality of pieces of distribution table information provided for respective partners are combined. More specifically, for each item, e.g., a single product name of a replacement component, a plurality of partner distribution flags is stored. The partner distribution flags correspond to the respective partners registered for the automatic ordering service. That is, a partner A distribution flag represents a flag of a supplier A, and a partner B distribution flag represents a flag of a supplier B. Therefore, according to the distribution table information illustrated in FIG. 12, the replacement components that the supplier A can distribute are the product names of "TN241BK", "TN241C", "TN241M", "TN241Y", "TN245BK", "DR-291CL-BK", and "BU-220CL". The replacement components that the supplier B can distribute are the product names of "TN241BK", "TN241C", "TN241M", "TN241Y", "DR-291CL-BK", and "BU-220CL". In the distribution table information, an applicable model is also associated with the description for each replacement component. The applicable model represents a printer model to which a replacement component having a product name listed in the same line as the applicable model in the distribution table information illustrated in FIG. 12 can be attached and in which the replacement component can be used. That is, for example, in a printer A indicated in the applicable model, replacement components each having one of the product names of "TN241BK", "TN245BK", "DR-291CL-BK", and "BU-220CL" can be attached and used therein.

The one or more products that the supplier, which corresponds to the partner ID stored in the temporary storage area in M126, can distribute, are extracted from the distribution table information. For example, in a case that the supplier A is identified based on the partner ID, the products of "TN241BK", "TN241C", "TN241M", "TN241Y", "TN245BK", "DR-291CL-BK", and "BU-220CL" whose partner A distribution flags indicate ON are extracted as distributable products. In a case that the printer model corresponding to the device identification information received in M184 indicates the printer A in the applicable model, one or more products appropriate for the printer A are extracted from the distributable products. That is, products of "TN241BK", "TN245BK", "DR-291CL-BK", and "BU-220CL" are extracted from the distributable products of "TN241BK", "TN241C", "TN241M", "TN241Y", "TN245BK", "DR-291CL-BK", and "BU-220CL". Information regarding the one or more extracted products is generated as distribution table information.

The generated distribution table information is transmitted from the administrative server 10 to the user PC 52 (M186). In response to receipt of the distribution table information, the user PC 52 displays, on the display, a selection screen (illustrated in FIG. 13) configured based on the distribution table information. The selection screen displays product names of the replacement components based on the transmitted information with the product names classified by category of attaching location. That is, in a case that the replacement components are toner cartridges or ink cartridges, the cartridges are attached to respective different locations in accordance with toner colors or ink colors. Therefore, the product names indicating the respective cartridges are classified by color. In a case that the replacement components are a drum and a belt, the drum and the belt are attached to respective different locations. Therefore, the product names indicating the drum and the belt are classified separately. Thus, in the selection screen illustrated in FIG. 13, the product names of "TN241BK" and "TN245BK" are classified in black toner, the product name of "DR-291CL-BK" is classified in drum, the product name of "BU-220CL" is classified in belt.

In the selection screen, a replacement component column is also displayed on a product name basis. The printer user selects, on the selection screen, one or more replacement components which are desired to be delivered through the automatic ordering service. More specifically, the selection screen includes one or more icons for enabling a user to select one or more replacement components which are desired to be delivered through the automatic ordering service. In response to selection of an icon by the user using, for example, the mouse, a checkmark is added in the replacement component column corresponding to the selected replacement component. Only one replacement component is allowed to be selected from one or more replacement components in each category of attaching location. That is, in the selection screen illustrated in FIG. 13, from the category of black toner cartridge including the product names of "TN241BK" and "TN245BK", only one of the product names of "TN241BK" and "TN245BK" is allowed to be selected. In response to the selection of one or more replacement components which are desired to be delivered through the automatic ordering service, information regarding the one or more selected replacement components (hereinafter, referred to as "selected product information") (as an example of selected replacement component information), that is, information regarding the one or more replacement components with the checkmarks indicated in the corresponding replacement component columns on the selection screen illustrated in FIG. 13 is transmitted from the user PC 52 to the administrative server 10 through an operation of the printer user (M188). The selected product information includes, for example, the product name of each of the one or more selected products. The selected product information may be information in which flags, each of which indicates whether the product has been selected or not, are added to all of the product names included in the distribution table information transmitted in M186. In the selection screen illustrated in FIG. 13, the black toner cartridge having the product name of "TN245BK" and the drum having the product name of "DR-291CL-BK" have been selected as replacement components whose delivery through the automatic ordering service is requested, and no belt has been selected as a replacement component whose delivery through the automatic ordering service is requested. That is, it is conceivable that the printer user has determined that a replacement of the belt is unnecessary or has determined to place an order for the belt by his/herself as necessary. The administrative server 10 that has received the selected product information stores the device ID used in M170 and the selected product information received in M188 in the data storage area 32 in association with each other, as device information (refer to FIG. 6) (M190). As illustrated in FIG. 6, a replacement component category, the product name, the description, and the product code are associated with each other as the selected product information.

As depicted in FIG. 6, in response to the storage of the partner ID and the device information in association with the user ID in the data storage area 32 of the administrative server 10 in accordance with the above-described procedure, the automatic ordering service in response to usage of the replacement components in the printer 50 is performed. More specifically, in response to execution of a printing process in the printer 50 (M200 (refer to FIG. 5)), the printer 50 transmits, to the administrative server 10, its device ID and the usage degree information every time the printing process is performed or at a predetermined timing (M202).

The usage degree information indicates degree to which replacement components used in the printer 50 have been used. More specifically, for example, in a case that the printer 50 is a laser printer, a remaining amount of toner is detected on a toner color basis and information regarding the remaining amount of toner of each color is transmitted to the administrative server 10 as the usage degree information. In a case that the printer 50 is the laser printer, the number of times the drum has been used from the last replacement is counted, and information regarding the number of uses is transmitted to the administrative server 10 as the usage degree information. In a case that the printer 50 is an inkjet printer, a remaining amount of ink in an ink cartridge is detected on an ink color basis and information regarding the remaining amount of ink of each color is transmitted to the administrative server 10 as the usage degree information. In the printer 50, the number of times the belt for drive force transmission used in a mechanism for conveying a printing sheet has been used from the last replacement is counted, and information regarding the number of uses is transmitted to the administrative server 10 as the usage degree information. The usage degree information includes information for identifying a replacement component category of the replacement component corresponding to the usage degree information.

In response to receipt of the device ID and the usage degree information, the administrative server 10 determines, based on the received usage degree information, whether a replacement component targeted for ordering satisfies a replacement component ordering requirement. More specifically, in a case that the usage degree information indicates one of the toner remaining amount and the ink remaining amount, the administrative server 10 determines whether the toner remaining amount or ink remaining amount of each color is lower than or equal to a threshold (M203). In a case that the usage degree information indicates one of the number of uses of the drum and the number of uses of the belt, the administrative server 10 determines whether the number of uses of the drum or belt is greater than or equal to a threshold (M203). When the usage degree information includes no information indicating that the remaining amount is lower than or equal to the threshold or that the number of uses is greater than or equal to the threshold (M203:NO), the processing executed in M200 and subsequent steps are repeated.

When the usage degree information includes information indicating that the remaining amount is lower than or equal to the threshold or that the number of uses is greater than or equal to the threshold (M203:YES), it is determined whether each replacement component category included in the usage degree information is included in the selected product information (M204). More specifically, based on the device information (refer to FIG. 6), the selected product information associated with the device ID received in M202 is identified. It is determined whether each replacement component category included in the usage degree information including information indicating that the remaining amount is lower than or equal to the threshold or information indicating that the number of uses is greater than or equal to the threshold is included in the identified selected product information. When each replacement component category is not included in the selected product information (M204:NO), the processing executed in M200 and subsequent steps are repeated. When each replacement component category is included in the selected product information (M204:YES), it is determined that the replacement component ordering requirement is satisfied.

Based on the determination that the replacement component ordering requirement is satisfied, the partner ID associated with the device ID received in M202 is identified based on the device information (refer to FIG. 6) stored in the data storage area 32, and the URL for ordering associated with the identified partner ID is identified based on the partner information (refer to FIG. 7) stored in the data storage area 32 (M206). The access token associated with the partner information of the identified partner ID is also identified (M206). The selected product information associated with the device ID received in M202 is identified based on the device information (refer to FIG. 6) stored in the data storage area 32, and one or more product codes associated with each replacement component category included in the replacement component information that satisfies the ordering requirement in M204 are identified based on the selected product information (refer to FIG. 6) (M206).

The administrative server 10 adds the one or more product codes identified in M206 to the URL for ordering identified in M206, using a query string. The administrative server 10 performs a replacement component ordering request by accessing the partner server 56 using the URL for ordering to which the product code is added (M208). At that time, the administrative server 10 also transmits the access token identified in M206 to the partner server 56. Thus, the partner server 56 acquires the one or more product codes and the access token. The partner server 56 identifies, based on the dispatch information (refer to FIG. 11), the address of the printer user associated with the access token acquired in M208 (M210).

The partner server 56 performs a replacement component dispatch process in response to the ordering request (M212). That is, the partner server 56 performs a process for dispatching the one or more replacement components corresponding to the one or more product codes acquired in M208 to the address of the printer user identified in M210. The partner server 56 identifies the charge collecting method associated with the access token received in M208 based on the dispatch information (refer to FIG. 11), and creates a bill in accordance with the charge collecting method (M214). The processing executed in M200 and subsequent steps are repeated again.

As described above, in the automatic ordering service, the replacement components that can be distributed by each supplier are stored in the administrative server 10 as the distribution table information. The printer user selects, from the distribution table information, one or more replacement components that are desired to be delivered through the automatic ordering service, and the one or more selected replacement components are stored in the administrative server 10 as the selected product information. The administrative server 10 places an order with one or more appropriate partner servers 56 for the one or more replacement components. Therefore, the one or more replacement components ordered from the one or more partner servers 56 are replacement components that can be surely distributed by the one or more partner servers 56, and thus a burden to each supplier may be reduced. In other words, preparing all replacement components available for use in at least one of printers to be targeted for the automatic ordering service is burden for each supplier. Therefore, in the communication system 1, the replacement components that can be distributed by each supplier are registered in the administrative server 10 as the distribution table information. The selected product information is selected by the printer user from the distribution table information and the administrative server 10 places an order with the one or more partner servers 56 with one or more replacement components included in the selected product information. Accordingly, each supplier is able to become one of the partners in the automatic sales service with replacement components that each supplier distributes normally without preparing a wide variety of replacement components. Consequently, in this and analogous configurations, a burden on each supplier is reduced.

For example, in a case that the number of variety of replacement components that a supplier distributes is increased or decreased, the staff member of the supplier is allowed to modify the distribution table information by accessing the administrative server 10 using the partner PC 58 to perform the processing in M105 to M110. Accordingly, the change in variety of supplier-distributable products may be reflected on the automatic ordering service easily.

The CPU 12 executes M186 is an example of first transmitting means. The CPU 12 executes M188 is an example of first receiving means. The CPU 12 executes M190 is an example of first storage control means. The CPU 12 executes M202 is an example of second receiving means. The CPU 12 executes M208 is an example of second transmitting means.

The present disclosure is not limited to the embodiments described above. The present disclosure may be implemented in various manners in which changes, arrangements and modifications may be applied based on knowledge of those skilled in the art. More specifically, in the embodiment, the plurality of suppliers are registered for the automatic ordering service. Nevertheless, the present disclosure may be applied to an automatic ordering service for which only a single supplier is registered. In this case, the distribution table information and the selected product information may be unnecessary to be stored on a supplier basis or a partner ID basis.

In the embodiment, the URL for registration includes the query string for identifying a partner, and a supplier is identified based on the query string. Nevertheless, the supplier may be identified in another manner. More specifically, for example, at the time of issuing the URL for registration, the administrative server 10 may issue a different URL for registration for each supplier, and store the issued URL for registration and a partner ID in association with each other. At the time the administrative server 10 is accessed using the issued URL for registration, the administrative server 10 may identify the partner ID associated with the URL for registration to identify the supplier based on the partner ID. The supplier may be identified in still another manner. That is, at the time of issuing a URL for registration, the administrative server 10 may issue and transmit the same URL for registration and a different string for each supplier. A staff member of a supplier provides an icon to which a link to a partner server 56 of the supplier on Web page data to be transmitted in M120. In a case that the user PC 52 accesses the link destination assigned to the icon, the staff member of the supplier transmits a redirect instruction to the user PC 52 such that the user PC transmits, to the administrative server 10, a request including the received string in the header of the URL for registration. Thus, when the administrative server 10 is accessed using the URL for registration, the administrative server 10 may identify the partner ID associated with the string included in the header of the request to identify the supplier based on the partner ID.

In the embodiment, the access token is transmitted directly from the partner server 56 to the administrative server 10. Nevertheless, in an alternative embodiment, the access token may be transmitted indirectly from the partner server 56 to the administrative server 10. That is, for example, the partner server 56 may transmit the access token to the user PC 52 and the user PC 52 may further transmit the access token to the administrative server 10.

In the embodiment, the replacement components of the printer are applied to targets for the automatic ordering service. Nevertheless, any replacement components, e.g., ink ribbons, threads, and tape cartridges, used in devices other than printers, e.g., facsimile machines, sewing machines, and label printers, may be applied to the targets for the automatic delivery service, in alternative embodiments consistent with the present disclosure.

In the embodiment, a numeric value that represents, for example, the remaining amount of ink or the number of uses of the belt, is adopted as the usage degree information of each replacement component. Nevertheless, information other than a numeric value may be adopted as the usage degree information, in alternative embodiments consistent with the present disclosure. For example, the printer 50 may determine whether the remaining amount of ink is less than or equal to a threshold. When the printer 50 determines the remaining amount of ink is less than or equal to the threshold, the printer 50 may transmit near-empty information to the administrative server 10 as the usage degree information. In this case, the administrative server 10 may receive the near-empty information. On condition that a replacement component corresponding to the near-empty information is included in the selected product information, the administrative server 10 may place an order for the replacement component.

In the embodiment, the administrative server 10 receives the usage degree information directly from the printer 50 connected to the network. Nevertheless, the administrative server 10 may receive the usage degree information indirectly through, for example, a PC, in alternative embodiments consistent with the present disclosure. That is, the printer 50 may be connected to the PC via, for example, one of a USB, a wired LAN, and a wireless LAN, and the usage degree information of the printer 50 may be transmitted to the administrative server 10 from the PC.

In the embodiment, the administrative server 10 consists of a single web server. Nevertheless, the administrative server 10 may consist of a plurality of web servers, in alternative embodiments consistent with the present disclosure.

In the embodiment, the administrative server 10 and the partner server 56 consist of respective independent web servers. Nevertheless, for example, the administrative server 10 and the partner server 56 may consist of a single web server, in alternative embodiments consistent with the present disclosure.

In the embodiment, the example in which the processing illustrated in FIGS. 2 to 5 are executed by the CPU 12 has been described. Nevertheless, the processing may be executed by not only the CPU 12 but by an ASIC or another logic integrated circuit. Further, the processing may be executed by a combination of a CPU, an ASIC, and another logic integrated circuit, in alternative embodiments consistent with the present disclosure.

There may be a case where no partner server 56 distributes a replacement component which the printer user requires at the time of selecting the necessary replacement component from the replacement component list that the application maintains. Nevertheless, according to the embodiment, the printer user selects one or more replacement components that are to be ordered in future from the replacement components that the partner servers 56 distribute. Therefore, the printer user can surely receive delivery of the one or more replacement components that the printer user requires at appropriate timings. That is, the printer user can select one or more required replacement components from the replacement components that the partner servers 56 surely distribute. Therefore, the printer user might not be confused at the time of selection and can select one or more desired replacement components easily. Accordingly, convenience of the printer user is increased.

There may be a case where a single partner server does not distribute all replacement components used in one or more printers 50 of the printer user. Nevertheless, in the embodiment, the printer user can place an order with a plurality of partner servers 56 for desired replacement components. Therefore, even when the printer user cannot place an order with a single partner server 56 for all of the desired replacement components, the printer user can place another order with one or more another partner servers 56 for the remainder of the desired replacement components. Accordingly, the printer user can surely receive delivery of all of the required replacement components from the plurality of partner servers 56.

In the embodiment, the administrative server 10 receives the distribution table information from each of the partner servers 56. The administrative server 10 transmits, to the user PC 52, the distribution table information regarding the partner server 56 identified based on the URL for registration used for user login. That is, the information regarding the replacement components that each of the partner servers 56 distributes is managed collectively in the administrative server 10. For example, if the information regarding the distributed replacement components is managed in each partner server 56 independently, the printer user needs to place an order with appropriate partner servers 56 for appropriate replacement components, and the ordering procedure may vary among the partner servers 56. Nevertheless, according to the embodiment, the administrative server 10 collectively manages all information on the replacement components that each of the partner servers 56 distributes. Accordingly, the printer user can place an order with appropriate partner servers 56 for desired replacement components by registering for the administrative server 10 only.

In the illustrative embodiment, the printer user selects one or more replacement components desired to be ordered from the distribution table information received from the administrative server 10. That is, the printer user can determine, based on distribution statuses of replacement components that the partner servers 56 distribute, one or more partner servers 56 from which desired replacement components are ordered. Accordingly, the printer user can order the desired replacement components with a simple operation from one or more partner servers 56 which supply the desired replacement components with reasonable prices.

The invention claimed is:

1. A system for reordering replacement components, the system comprising:
    a server comprising:
        a communication interface;
        a memory;
        a controller operatively connected to the communication interface and the memory, the controller configured to execute instructions from the memory that, when executed, cause the server to perform:

in response to receipt of a request from a user device, transmitting replacement component information to the user device via the communication interface; wherein the replacement component information relates to one or more replacement components that can be distributed through a delivery service implemented by an external device and which is useable in a device that is associated with a user of the user device and which has replaceable components, the one or more replacement components being among the replaceable components useable in the device;

receiving selected replacement component information that relates to a selected replacement component from the one or more replacement components included in the replacement component information, via the communication interface, from the user device;

storing the selected replacement component information in the memory in association with device identification information, wherein the device identification information identifies the device associated with the user and which has replaceable components;

receiving, via the communication interface; usage degree information and the device identification information of the device, wherein the usage degree information indicates a degree to which the selected replacement component of the device has been used; and based on the usage degree information indicating that the selected replacement component has reached a predetermined usage degree;

transmitting an ordering request to the external device via the communication interface, wherein the ordering request includes first user identification information and specifies the selected replacement component; wherein the first user identification information is used in the external device for identifying the user of the device identified by the device identification information.

2. The system of claim 1, wherein the selected replacement component information relates to a plurality of selected replacement components.

3. The system of claim 1, wherein the selected replacement component is among a plurality of consumable components used in the device, and wherein the usage degree information indicates the degree to which each of the plurality of consumable components has been used.

4. The system of claim 3, wherein the plurality of consumable components comprise ink cartridges.

5. The system of claim 1, wherein the request from the user device is based on connection information received by the user device from the external device.

6. The system of claim 5, wherein the replacement component information is stored in the memory.

7. The system of claim 6, wherein the communication interface is configured to communicate with a plurality of external devices, each of the plurality of external devices being associated with a different delivery service;

wherein the memory is configured to store replacement component information from each of the plurality of external devices and connection information for each of the plurality of external devices, the connection information differing among the plurality of external devices; and wherein, in response to receipt of the request from the user device using the connection information, the controller is configured to transmit the replacement component information stored in the memory that is associated with the external device identified by the connection information.

8. The system of claim 6, wherein the communication interface is configured to communicate with a plurality of external devices, each of the plurality of external devices being associated with a different delivery service;

wherein the memory is configured to store destination information and connection information for each of the plurality of external devices, wherein the destination information indicates a destination external device of the ordering request and the connection information differing among the plurality of external devices; and wherein the controller is further configured to perform:
in response to receipt of the request using the connection information from the user device, receive the first user identification information via the communication interface, wherein the first user identification information is used by the external device identified by the connection information to identify the user of the user device;

storing in the memory the first user identification information and external device identification information in association with each other, wherein the external device identification information identifies the external device corresponding to the connection information; and transmitting the ordering request including the first user identification information of the user of the device identified by the device identification information, using the destination information corresponding to the external device identified by the external device identification information stored in the memory in association with the first user identification information.

9. The system of claim 5, wherein the memory is configured to store replacement component information for each of a plurality of devices; and wherein the controller is further configured to perform:
transmitting to the user device the replacement component information appropriate for the device owned by the user of the user device that transmitted the request using the connection information.

10. The system of claim 9, wherein the controller is further configured to perform:
storing second user identification information in the memory in association with each device identification information of one or more devices owned by the user, wherein the second user identification information identifies the user of the user device that transmitted the request using the connection information; and transmitting the replacement component information appropriate to a specified device to the user device in response to receipt of a selection of the specified device from among the one or more devices owned by the user; and storing in the memory the selected replacement component information in association with the device identification information identifying the specified device;

wherein transmitting the ordering request includes specifying a replacement component included in the selected replacement component information stored in the memory in association with the device identification information identifying the specified device.

11. The system of claim 5, wherein the server is configured to communicate with a plurality of external devices and stores connection information that differs among the plurality of external devices,
wherein the controller is configured to perform:
storing destination information for each of the plurality of external devices in the memory, the destination information indicating a destination external device of the ordering request;
receive the first user identification information in response to receipt of the request using the connection information from the user device, wherein the first user identification information identifies the user of the user device to the external device corresponding to the connection information.

12. The system of claim 11, wherein the controller is further configured to perform:
in response to receipt of the request using the connection information, receiving the first user identification information via the communication interface, the first user identification information useable by the external device associated with the connection information to identify the user of the user device;
storing in the memory the first user identification information in association with external device identification information, the external device identification information identifying the external device corresponding to the connection information;
transmitting the ordering request, including the first user identification information corresponding to the user of the device identified by the device identification information, using the destination information corresponding to the external device identified by the external device identification information stored in association with the first user identification information.

13. The system of claim 5, wherein the server is configured to communicate with a plurality of external devices, and wherein the memory is configured to store location information for each of the plurality of external devices, the location information associated with each external device indicating a location of that external device in a network;
wherein the connection information differs among the plurality of external devices; and
wherein the controller is further configured to perform:
in response to receipt of the request using the connection information from the user device, transmitting the location information associated with the external device identified by the connection information to the user device; and
receiving the first user identification information in response to an indication of agreement to grant the first user identification information to the server, the indication of agreement being in response to a request by the external device identified by the connection information to the user device.

14. The system of claim 1, wherein the delivery service comprises a third party delivery service.

15. The system of claim 1, wherein the server comprises a single computing device.

16. The system of claim 1; wherein the user device is different from the device that is associated with the user and which has replaceable components.

17. The system of claim 16, wherein the device that is associated with the user and which has replaceable components comprises a printer.

18. The system of claim 1, wherein the controller is further configured to perform:
receiving the replacement component information from a supplier that offers the delivery service through the external device; and
storing, in the memory, the replacement component information received from the supplier.

19. The system of claim 18,
wherein receiving the replacement component information includes receiving replacement component identification information, the replacement component identification information identifying a replacement component to the external device; and
wherein the controller is further configured to perform transmitting, to the external device; the ordering request including the replacement component identification information.

20. The system of claim 1, further comprising the user device and the device associated with the user which has replaceable components; and
wherein the server is remote and separate from both the user device and the device associated with the user which has replaceable components.

21. The system of claim 20, further comprising the external device, and wherein the server is remote and separate from the external device.

22. A method for reordering replacement components, the method comprising:
in response to receipt of a request from a user device at a server having a memory and a communication interface; transmitting replacement component information to the user device via the communication interface, wherein the replacement component information relates to one or more replacement components that can be distributed through a delivery service implemented by an external device and which is useable in a device that is associated with a user of the user device and which has replaceable components, the one or more replacement components being among the replaceable components useable in the device;
receiving selected replacement component information that relates to a selected replacement component from the one or more replacement components included in the replacement component information, via the communication interface, from the user device;
storing the selected replacement component information in the memory in association with device identification information, wherein the device identification information identifies the device associated with the user and which has replaceable components;
receiving, via the communication interface, usage degree information and the device identification information of the device, wherein the usage degree information indicates a degree to which at least the selected replacement component of the device has been used; and
based on the usage degree information indicating that the selected replacement component has reached a predetermined usage degree, transmitting an ordering request from the server to the external device via the communication interface, wherein the ordering request includes first user identification information and specifies the selected replacement component, wherein the first user identification information is used in the external device for identifying the user of the device identified by the device identification information.

23. A method for reordering replacement components, the method comprising:
   transmitting a request to a server;
   receiving, in response to the request, replacement component information relating to one or more replacement components that can be distributed through a delivery service implemented by an external device, the delivery service being useable by a device that is associated with a user and which has replaceable components, the one or more replacement components being among the replaceable components useable in the device; and
   transmitting, to the server, selected replacement component information that relates to a selected replacement component from the one or more replacement components included in the replacement component information;
   wherein; based on usage degree information transmitted to the server that indicates that the selected replacement component has reached a predetermined usage degree, an ordering request is issued to the external device, wherein the ordering request includes first user identification information and specifies the selected replacement component, wherein the first user identification information is used in the external device for identifying the user of the device identified by the device identification information, and wherein the usage degree information indicates a degree to which at least the selected replacement component of the device has been used.

24. The method of claim 23, further comprising receiving the selected replacement component for the device identified by the device identification information based on the ordering request issued to the external device from the server.

25. The method of claim 23, further comprising transmitting, to the server, the usage degree information and the device identification information of the device.

26. A system for reordering replacement components, the system omprising:
   a server comprising:
      a communication interface;
      a memory;
      a controller operatively connected to the communication interface and the memory, the controller configured to execute instructions from the memory that, when executed, cause the server to perform:
         receiving a request from a user device including connection information associated with an external device implementing a delivery service;
         storing replacement component information in the memory of the server in association with device identification information and the connection information, the replacement component information relating to one or more replacement components that can be distributed through the delivery service implemented by the external device and which are useable in a device which has replaceable components and is associated with a user of the user device, the device being identified by the device identification information;
         receiving, via the communication interface, usage degree information and the device identification information of the device, wherein the usage degree information indicates a degree to which the replacement component of the device has been used; and
         based on the usage degree information indicating that the replacement component has reached a predetermined usage degree, transmitting an ordering request to the external device via the communication interface, wherein the ordering request includes first user identification information and specifies the replacement component, wherein the first user identification information is used in the external device for identifying the user of the device identified by the device identification information.

27. The system of claim 26, wherein the external device is from among a plurality of external devices implementing a plurality of different delivery services.

28. An intermediary device comprising:
   a communication portion configured to communicate with a user's information processing device and an external device for implementing a delivery service for replacement components of a device;
   a storage portion; and
   a controller, including:
      first transmitting means configured to, in response to receipt from the user's information processing device of a request based on connection information received by the user's information processing device from the external device, transmit replacement component information to the user's information processing device via the communication portion, wherein the replacement component information is stored in the storage portion and relates to at least one replacement component that can be distributed through the delivery service implemented by the external device among the replacement components used in the device;
      first receiving means configured to receive selected replacement component information that relates to at least one replacement component selected from the at least one replacement component included in the replacement component information, via the communication portion, from the user's information processing device to which the replacement component information is transmitted by the first transmitting means;
      first storage control means configured to store the at least one selected replacement component information and device identification information in the storage portion in association with each other, wherein the device identification information is for identifying the device owned by a user of the user's information processing device that has transmitted the request based on the connection information;
      second receiving means configured to receive, via the communication portion, usage degree information and the device identification information of the device, wherein the usage degree information indicates degree to which each of the replacement components of the device has been used; and
      second transmitting means configured to, when, in the usage degree information received by the second receiving means, of the replacement components of the device, the degree to which at least one of the at least one selected replacement component included in the selected replacement component information has been used reaches a predetermined usage degree, transmit an ordering request to the external device, via the communication portion, wherein the ordering request includes first user identification information and specifies the at least one replacement component included in the selected replacement component information stored in the storage portion in association with the device identification information received by the second receiving means; wherein the first user identification information is used in the external device for identifying the user of the device identified by the device identification information received by the second receiving means.

29. An intermediary device comprising:
a communication interface configured to communicate with a user's information processing device and an external device for implementing a delivery service for replacement components of a device;
a memory; and
a controller configured to execute instructions from the memory that, when executed, cause the server to perform:
 transmitting; in response to receipt from the user's information processing device of a request based on connection information received by the user's information processing device from the external device, replacement component information to the user's information processing device via the communication interface, wherein the replacement component information is stored in the memory and relates to at least one replacement component that can be distributed through the delivery service implemented by the external device among the replacement components used in the device;
 receiving selected replacement component information that relates to at least one replacement component selected from the at least one replacement component included in the replacement component information, via the communication interface, from the user's information processing device to which the replacement component information is transmitted;
 storing the at least one selected replacement component information and device identification information in the memory in association with each other, wherein the device identification information is for identifying the device owned by a user of the user's information processing device that has transmitted the request based on the connection information;
 receiving, via the communication interface, usage degree information and the device identification information of the device, wherein the usage degree information indicates degree to which each of the replacement components of the device has been used; and
 transmitting, when, in the usage degree information, of the replacement components of the device, the degree to which at least one of the at least one selected replacement component included in the selected replacement component information has been used reaches a predetermined usage degree, an ordering request to the external device, via the communication interface, wherein the ordering request includes first user identification information and specifies the at least one replacement component included in the selected replacement component information stored in the memory in association with the device identification information, wherein the first user identification information is used in the external device for identifying the user of the device identified by the device identification information.

* * * * *